United States Patent [19]
Murakami

[11] Patent Number: 5,473,223
[45] Date of Patent: Dec. 5, 1995

[54] VERTICAL DEFLECTION WAVEFORM GENERATING APPARATUS

[75] Inventor: Yasuo Murakami, Nagasaki, Japan

[73] Assignee: Mitsubishi Denki Kabushiki Kaisha, Tokyo, Japan

[21] Appl. No.: 180,382

[22] Filed: Jan. 12, 1994

[30] Foreign Application Priority Data

Apr. 20, 1993 [JP] Japan .................................. 5-115235

[51] Int. Cl.⁶ .............................. G09G 1/04; H01J 29/70
[52] U.S. Cl. ......................... 315/367; 315/371; 315/403
[58] Field of Search ................................. 315/367, 371, 315/389, 403, 368.12, 368.13, 368.18; 348/866

[56] References Cited

U.S. PATENT DOCUMENTS

| | | | |
|---|---|---|---|
| 4,870,329 | 9/1989 | Ara | 315/367 |
| 4,933,769 | 6/1990 | Maas | 315/367 |
| 5,294,866 | 3/1994 | Miyazaki et al. | 315/367 |
| 5,298,985 | 3/1994 | Tsujihara et al. | 348/745 |
| 5,325,025 | 6/1994 | Gawell et al. | 315/408 |

FOREIGN PATENT DOCUMENTS

| | | |
|---|---|---|
| 0323677 | 7/1989 | European Pat. Off. . |
| 0503915 | 9/1992 | European Pat. Off. . |
| 62-230167 | 10/1987 | Japan . |
| 63-99675 | 4/1988 | Japan . |
| 3-185489 | 8/1991 | Japan . |

*Primary Examiner*—Gregory C. Issing
*Attorney, Agent, or Firm*—Burns, Doane, Swecker & Mathis

[57] ABSTRACT

A vertical deflection waveform generating apparatus is provided to have a memory in which a function of a vertical deflection waveform is previously stored. The function is a function with an order of horizontal scanning lines in which linearity of a raster is corrected as a parameter. The vertical deflection waveform generating apparatus generates a vertical deflection waveform by a digital signal processing circuit substituting a scanning order of the next scanning line in the parameter of the function, and sequentially outputting vertical deflection voltage at each time of detection of a horizontal synchronizing signal. Further, in order to reduce raster moiré, timing for generating the vertical deflection waveform is offset for each frame.

13 Claims, 9 Drawing Sheets

VERTICAL DEFLECTION WAVEFORM GENERATING APPARATUS

BACKGROUND OF THE INVENTION

1. Field of the Invention

The present invention relates to a vertical deflection waveform generating apparatus for use in display units employing a CRT such as a television receiver, which enables control of, for example, a vertical width, vertical linearity, and a vertical position of a raster.

2. Description of the Prior Art

Figure 13:
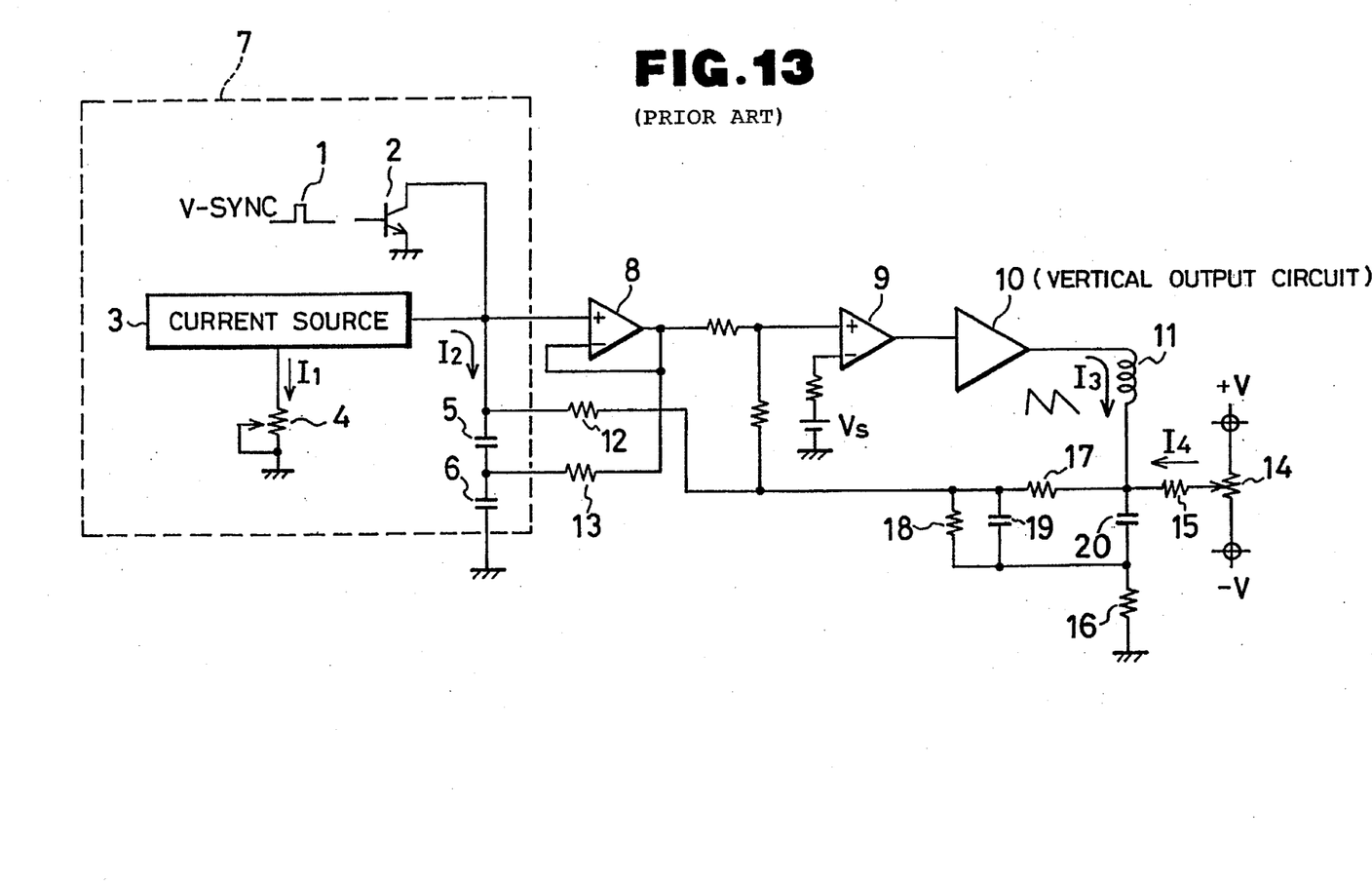
FIG. 13 is a block diagram showing a conventional vertical deflection waveform generating apparatus.

FIG. 13 is a circuit diagram showing a conventional vertical deflection waveform generating apparatus. In FIG. 13, reference numeral 1 means a vertical synchronizing signal which is input from an internal synchronous circuit or is externally input, 2 means a transistor which is turned ON or OFF by the vertical synchronizing signal 1, 3 is a current source, 4 is a resistor for current adjustment, 5 and 6 are capacitors for generating a sawtooth waveform, and 7 is a sawtooth wave generating circuit including the component parts 1 to 6.

Further, reference numeral 8 is a buffer amplifier, 9 is a vertical drive circuit, 10 is a vertical output circuit, 11 is a vertical deflection coil, 12 and 13 are resistors for correcting vertical linearity, 14 and 15 are respectively a variable resistor and a resistor for controlling a vertical position, and 16 is a resistor for detecting vertical deflection current. Reference numerals 17 to 20 are resistors and capacitors for generating S-shaped correction waveform, respectively.

When the transistor 2 is turned ON by the vertical synchronizing signal 1, the capacitors 5 and 6 are discharged through the transistor 2. When the transistor 2 is turned OFF, the capacitors 5 and 6 are charged by current $I_2$ from the current source 3. At that time, current $I_1$ is adjusted by the resistor 4 so as to adjust the current $I_2$ serving as mirror current of the current $I_1$. Subsequently, when the vertical synchronizing signal 1 is applied again, the transistor 2 is turned ON again so that the capacitors 5 and 6 are discharged.

The above operation is repeated to generate sawtooth voltage at a terminal of the capacitor 5. The sawtooth voltage is applied to the vertical drive circuit 9 through the buffer amplifier 8, and is compared with reference voltage $V_s$ for waveform shaping. Thereafter, the sawtooth voltage is further amplified by the vertical output circuit 10, and is applied to the vertical deflection coil 11. Thereby, sawtooth vertical deflection current 13 flows in the vertical deflection coil 11.

In order to perform S-shaped correction as vertical linearity correction to the vertical deflection current $I_3$, charging current for the capacitor 6 is controlled by the resistor 13 in the first half of the S-shaped correction waveform, and charging current for the capacitor 5 is controlled by the resistor 12 in the latter half of the S-shaped correction waveform.

Further, in order to perform vertical position control of a raster, the variable resistor 14 is adjusted to control current $I_4$ in the resistor 15. As a result, the vertical position of the raster can be adjusted. In addition to the conventional embodiment as set forth above, other related prior arts are disclosed in Japanese Patent Application Laid-Open Nos. 3-185489, 62-230167 and 63-99675.

The conventional vertical deflection waveform generating apparatus is provided as set forth above. Therefore, in order to manage modification or variation in the number of lines, in vertical timing and the like, it is necessary to provide plural sets of resistors 12, 13 for vertical linearity correction, and to select an appropriate set of resistors 12, 13 by a switch. Hence, there is a problem in that, for example, the number of assemblies is increased. Alternatively, it is considered possible to use output voltage of the S-shaped correction waveform so as to manage these modifications and the variations. However, since only a correction waveform having a predetermined pattern can be obtained, there are some problems in that, for example, it is not always possible to provide the optimal vertical linearity for all vertical frequencies, all timing, and all CRTs.

SUMMARY OF THE INVENTION

The present invention is made to overcome the problems as set forth above.

It is the first object of the present invention to provide a vertical deflection waveform generating apparatus which enables control of a vertical width and a vertical position of a raster, and vertical linearity correction with high accuracy by using lesser number of assemblies and less memory capacity.

It is the second object of the present invention to provide a vertical deflection waveform generating apparatus which can reduce raster moiré.

According to the present invention, for achieving the above-mentioned objects, there is provided a vertical deflection waveform generating apparatus including storing means in which waveform information of a vertical deflection waveform is represented and stored as a function with a scanning order of a horizontal scanning line in a raster scan as a parameter, and vertical deflection waveform generating means for generating the vertical deflection waveform by substituting the scanning order of the horizontal scanning line in the parameter of the function, and calculating vertical deflection waveform voltage for each horizontal scanning line.

Further, in the vertical deflection waveform generating apparatus according to the present invention, the vertical deflection waveform is generated at every other frame in the raster scan when a predetermined period of time elapses after a vertical synchronizing signal is detected, and the vertical deflection waveform is generated at the frames after the vertical synchronizing signal is detected.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIGS. 10(a–c) is a timing chart illustrating an operation in the fourth embodiment of the present invention;

DETAILED DESCRIPTION OF THE PREFERRED EMBODIMENTS

Preferred embodiments of the invention will now be described in detail referring to the accompanying drawings.

Embodiment 1

Figure 1:
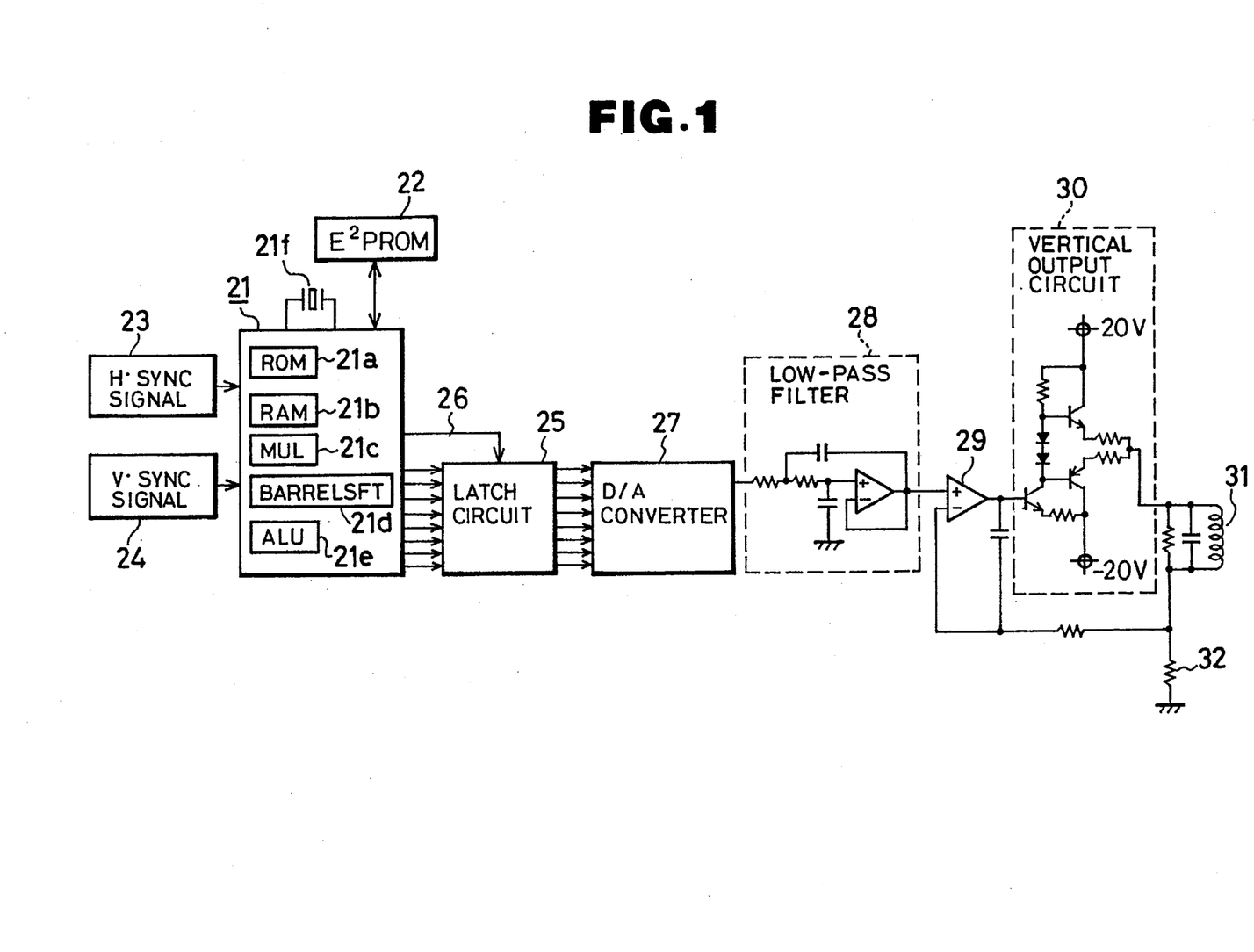
FIG. 1 is a block diagram showing a vertical deflection waveform generating apparatus according to a first embodiment of present invention.

FIG. 1 is a diagram showing a configuration of one embodiment of a vertical deflection waveform generating apparatus according to the present invention.

In FIG. 1, reference numeral 21 means a digital signal processing circuit (hereinafter referred to as DSP) which executes an instruction or an operation at a high speed of about 100 nsec or less to perform a waveform calculation, an interpolation operation, output control and the like. The DSP 21 includes, for example, a ROM 21a, a RAM 21b, a multiplier 21c, a barrel shifter 21d, an arithmetic and logic unit 21e, and a crystal reference oscillator 21f. Reference numeral 22 is an $E^2$ PROM (i.e., electrically erasable/programmable ROM) to temporarily store data used for processing of the DSP 21. The ROM 21a, the RAM 21b, and the $E^2$ PROM 22 form storing means for storing each parameter as will be described.

Reference numeral 23 means a horizontal synchronizing signal which is fed from an internal synchronous circuit or is externally fed into the DSP 21, 24 means a vertical synchronizing signal which is similarly fed into the DSP 21, 25 is a latch circuit to hold an 8-bit data output from the DSP 21, 26 is a latch signal fed from the DSP 21 into the latch circuit 25, and 27 is a D/A converter to convert output data from the latch circuit 25 into an analog signal.

Reference numeral 28 means a low-pass filter (hereinafter referred to as LPF) into which output from the D/A converter 27 is fed, 29 means a differential amplifier into which output from the LPF (low-pass filter) 28 and a feedback signal, as will be described later are fed, 30 is a vertical output circuit into which output from the differential amplifier 29 is fed, 31 is a vertical deflection coil into which vertical deflection current output from the vertical output circuit 30 is fed, and 32 is a detection resistor to detect the vertical deflection current so as to provide the feedback signal to the differential amplifier 29.

A description will now be given of the operation.

Figure 2:
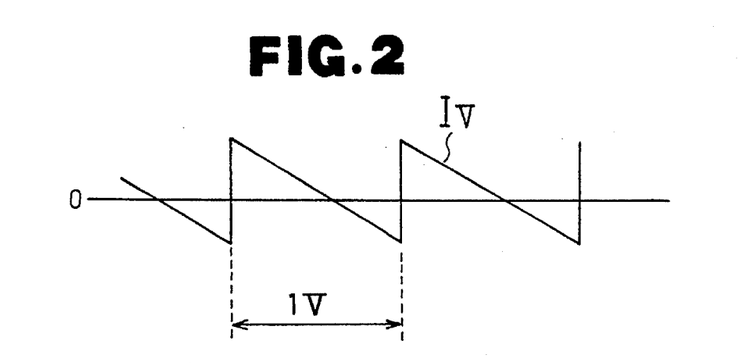
FIG. 2 is a waveform diagram of vertical deflection current.

FIG. 2 shows a waveform of vertical deflection current $I_v$ flowing in the vertical deflection coil 31, i.e., a sawtooth waveform having a cycle of vertical period (1 V). The sawtooth waveform is amplified by the differential amplifier 29 and the vertical output circuit 30 so that the vertical deflection current can flow in the vertical deflection coil 31. The deflection current is detected by the detection resistor 32, and is fed back to a negative terminal of the differential amplifier 29. As a result, control is made such that the vertical deflection current flowing in the vertical deflection coil 31 has the same waveform as that fed from the LPF 28.

Therefore, a variation in an output waveform from the LPF 28 results in a change of the vertical deflection current in the vertical deflection coil 31 according to that variation. That is, it is possible to control a vertical width, vertical linearity, and a vertical position of a raster or the like in a desired manner according to the output waveform from the LPF 28.

The output waveform of the LPF 28 is created in the DSP 21 in such a manner as will be described hereinafter.

A first input to the DSP 21 is the total number $n_T$ of a horizontal scanning lines for the 1 V period. The input can be performed by several methods such as reading a signal which is fetched from the ROM 21a and is transmitted to the $E^2$ PROM 22, inputting from an external microcomputer, and counting the lines for the 1 V period.

Figure 3:
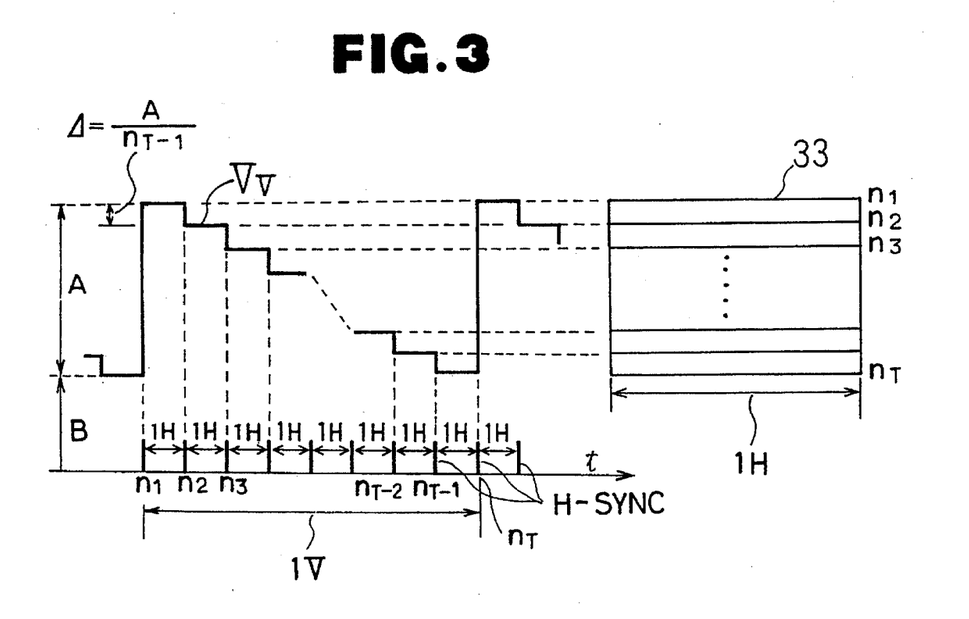
FIG. 3 is block diagram showing a relation between vertical deflection voltage and a raster.

FIG. 3 is a diagram showing a relation between the raster and the vertical deflection voltage waveform.

In FIG. 3, $V_v$ means vertical deflection voltage having the sawtooth waveform, A is a parameter to control the vertical width, and B is a parameter to control the vertical position of the raster, which may be either a positive value or a negative value. Reference numeral 33 means the raster, and $n_1, n_2, n_3, \ldots n_T$ each represent a horizontal line of the raster.

The DSP 21 of FIG. 1 calculates an amplitude difference $\Delta$ for each line of amplitude A shown in FIG. 3 depending upon the expression $\Delta = A/(n_T - 1)$ at each time that the vertical synchronizing signal 24 is input into the DSP 21, and records the result in the RAM 21b. Subsequently, at each time that the horizontal synchronizing signal 23 is input into the DSP 21, a position value X representing the vertical position of the next line $n_i$ is calculated depending upon the expression $X = A + B - \Delta \cdot n_i$ for a 1H period of the signal, and the value X is used at a time of scanning the line $n_i$.

As set forth above, the respective calculations are performed for each input of the vertical synchronizing signal 24 and the horizontal synchronizing signal 23. It is thereby possible to provide a step-wise waveform of the vertical deflection voltage $V_v$. The waveform is output through the latch circuit 25 and the D/A converter 27, and the step-wise waveform is smoothed through the low-pass filter 28.

Figure 4A:
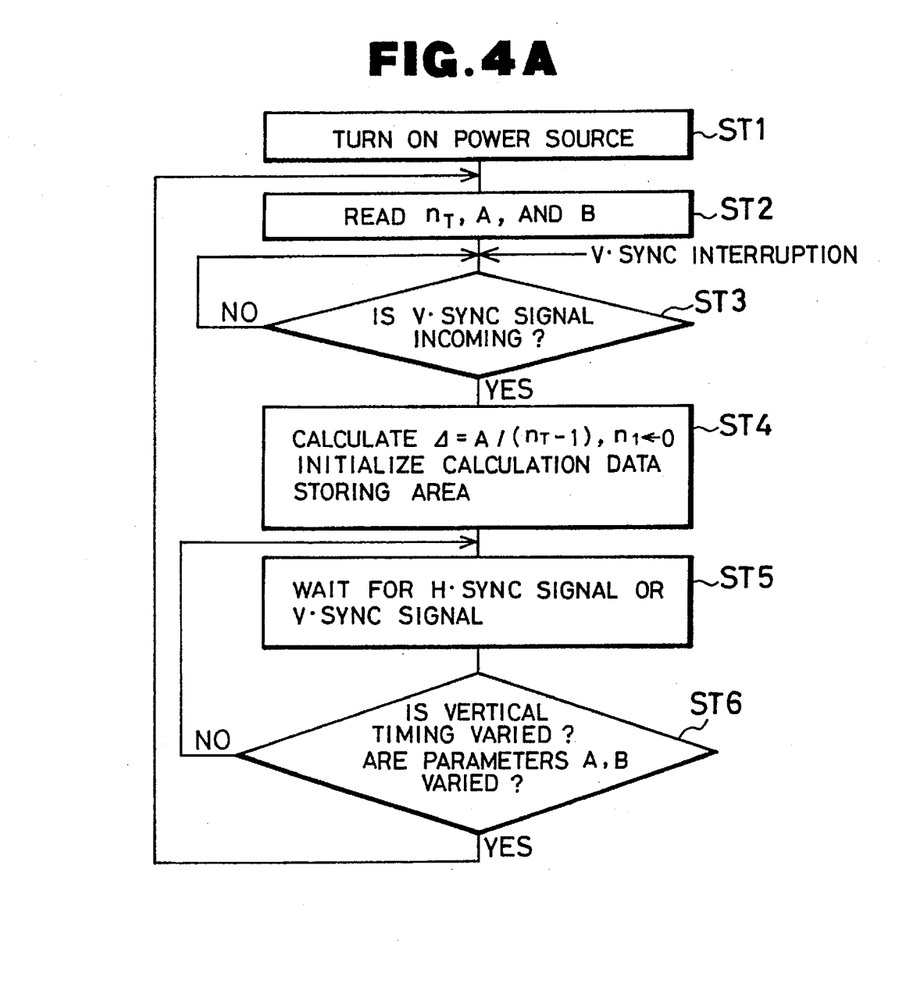
FIGS. 4A and 4B are flowcharts showing an operation in the embodiment 1.
Figure 4B:
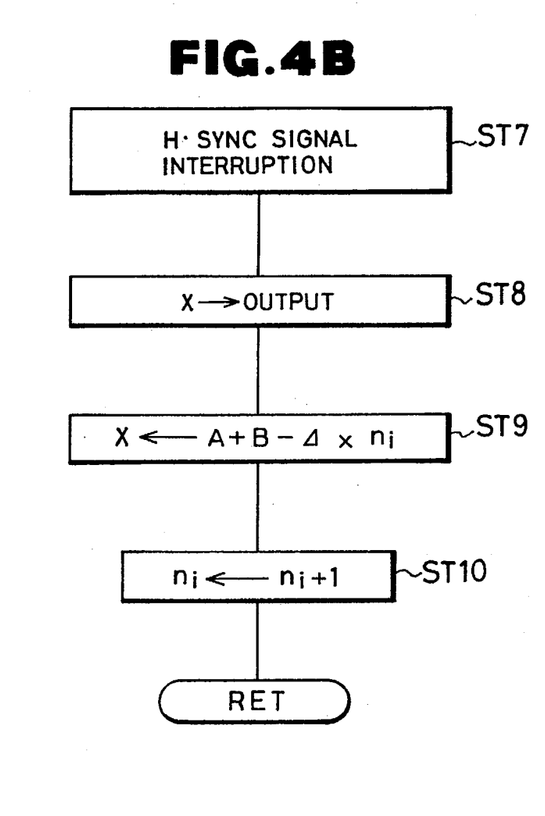

FIGS. 4A and 4B are flowcharts showing processing which are executed in the DSP 21 to perform the above operation.

In FIG. 4A, when a power source is turned ON in Step ST1, the respective parameters such as $n_T$, A, B are read in Step ST2, and the operation waits for the incoming vertical synchronizing signal in Step ST3.

When the vertical synchronizing signal is detected, in Step ST4, $\Delta$ is calculated, and $n_i$ is set to zero, and the memories such as the RAM 21b are initialized. Thereafter, in Step ST5, the operation waits for the next vertical synchronizing signal or horizontal synchronizing signal. When the vertical synchronizing signal is detected, the operation proceeds to Step ST6 where it is decided whether or not the vertical timing, and the respective parameters A, B are varied. If variation is detected, the operation returns to Step ST2 where the varied parameters are reread. When there is no variation, the operation returns to Step ST5.

When the horizontal synchronizing signal is detected in Step ST5, the operation proceeds to the processing as shown in FIG. 4B. FIG. 4B is a horizontal synchronization interruption handling program beginning at Step ST7 upon detection of the synchronizing signal. In Step ST8, the calculated value X is output to scan for the 1H period. In Step ST9, for the 1H period, the value X for the next 1H period is calculated and held. Thereafter, a value of $n_i$ is increased by one in Step ST10, and the operation turns back to Step ST5.

When the vertical synchronizing signal is detected in Step ST5, the operation proceeds to Step ST3.

Embodiment 2

Figure 5:
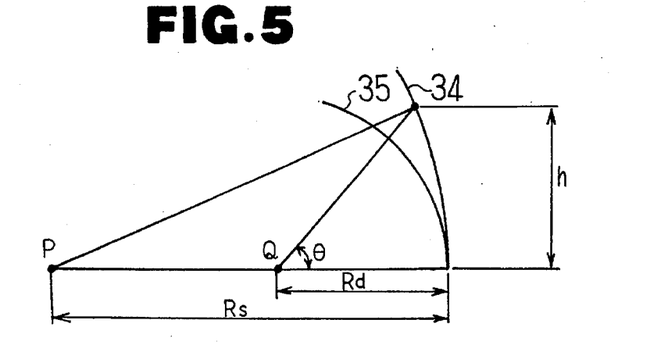
FIG. 5 is an explanatory view of a vertical deflection waveform generating apparatus according to a second embodiment of the present invention.

The first embodiment has been described with reference to a case of providing the vertical deflection voltage $V_v$ having a simple sawtooth waveform. However, since a center P of a face plate 34 of a CRT is different from a deflection beam center Q in the real CRT as shown in FIG. 5, linearity may be damaged at the upper and lower portions of a display. Hence, it is necessary to perform vertical linearity correction.

In FIG. 5, $R_s$ means a radius of curvature of the face plate 34, $R_d$ means a radius of beam deflection, θ is a beam deflection angle, and reference numeral 35 denotes a partial circle having the radius $R_d$. Further, h means a deviation from a display center due to the deflection angle θ, and can be expressed by the following expression (1):

$$h = R_s \cdot \sin\theta \sqrt{1 - \frac{(R_d - R_s)^2}{R_s^2} \cdot \sin^2\theta} + (R_d - R_s)\sin\theta \cdot \cos\theta \quad (1)$$

Figure 6:
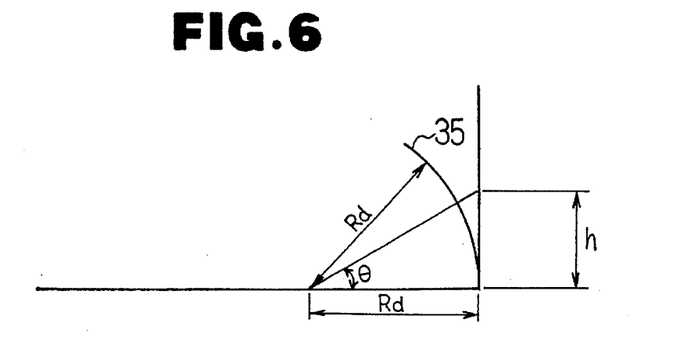
FIG. 6 is an explanatory view of the second embodiment.

It is assumed that $R_s$ is far greater than $R_d$, the configuration shown in FIG. 5 can be considered as shown in FIG. 6. Angle displacement of the deviation h: $dh/d\theta$ can be expressed by the expression (2) as follows:

$$\frac{dh}{d\theta} \propto \frac{1}{\cos^2\theta} \quad (2)$$

However, since $-\pi/4 < \theta < \pi/4$ in actuality, the expression (2) is expressed as the following expression (3):

$$Y = -A \cdot n_i + C \sin\pi \cdot \frac{n_i}{n_T} + B \quad (3)$$

where C is a parameter to control a vertical linearity correction amount. The expression (3) can be used for linearity correction. Therefore, it is possible to easily perform the control and the correction of, for example, a vertical width, a vertical position, and the vertical linearity by reading parameters A, B and C from a ROM 21a, or externally inputting the respective parameters A, B and C into $E^2$ PROM 22 so as to specify the parameters.

Further, when a vertical linearity condition is varied to, for example, adjust a linearity balance between upper and lower portions of the display, the expression (4) is employed as an example:

$$Y = -A \cdot n_i^2 + C \sin\pi \cdot \frac{n_i}{n_T} + B \quad (4)$$

Figure 7:
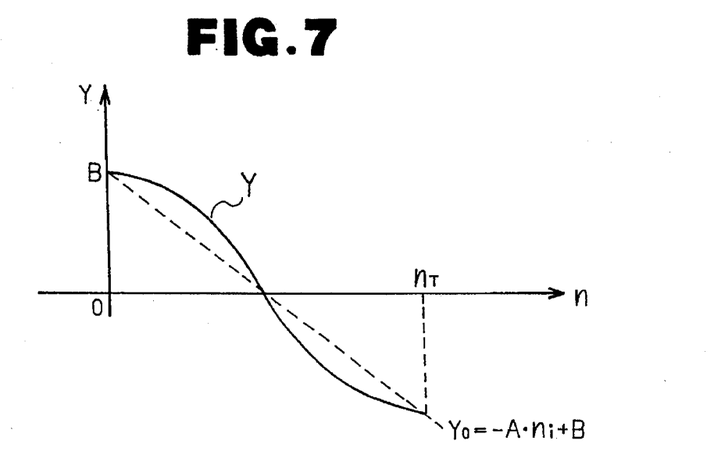
FIG. 7 is a graph according to the expression (3) in the second embodiment.

FIG. 7 is a graph according to the expression (3), in which a S-shaped correction is applied to the basic sawtooth waveform shown by reference numeral $Y_O$.

Embodiment 3

A description will now be given of another embodiment of the present invention.

A line on a raster is sampled for each appropriate line number, and the respective sampled lines are externally adjusted such that the lines are positioned at desired positions on a display. The respective positions $Y_i$ are recorded in the RAM 21b or the $E^2$ PROM 22 corresponding to the respective lines.

Figure 8:
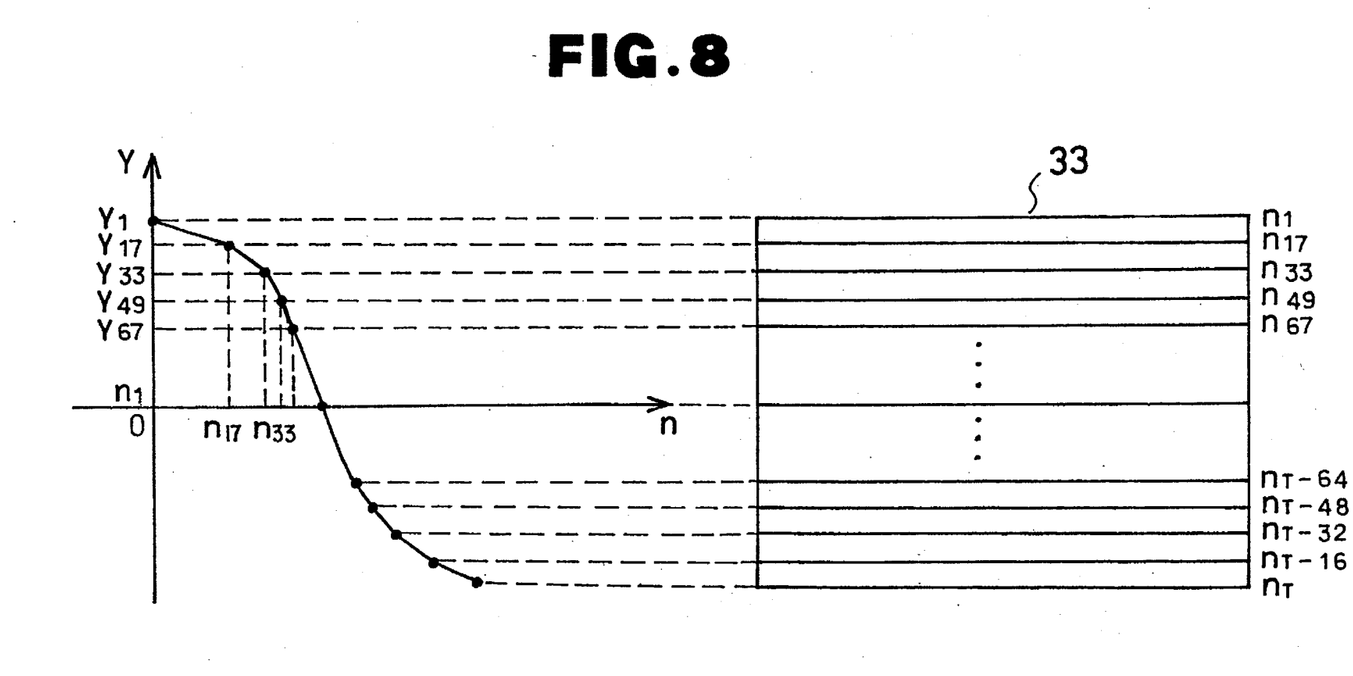
FIG. 8 is a diagram showing a relation between a vertical deflection waveform and a scanning line in case linearity correction is performed.

FIG. 8 shows the above operation. In this case, the lines ($n_1$, $n_{17}$, $n_{33}$ ...) are sampled for each set of 16 lines. As shown in FIG. 8, linear interpolation for each line is performed by an interpolation operation to the positions ($Y_1$, $Y_{17}$, $Y_{33}$, $Y_{49}$, $Y_{67}$ ...) corresponding to the lines ($n_1$, $n_{17}$, $n_{33}$ ...) adjusted as described before. As a result, it is possible to generate a vertical deflection voltage waveform from the DSP 21.

Figure 9:
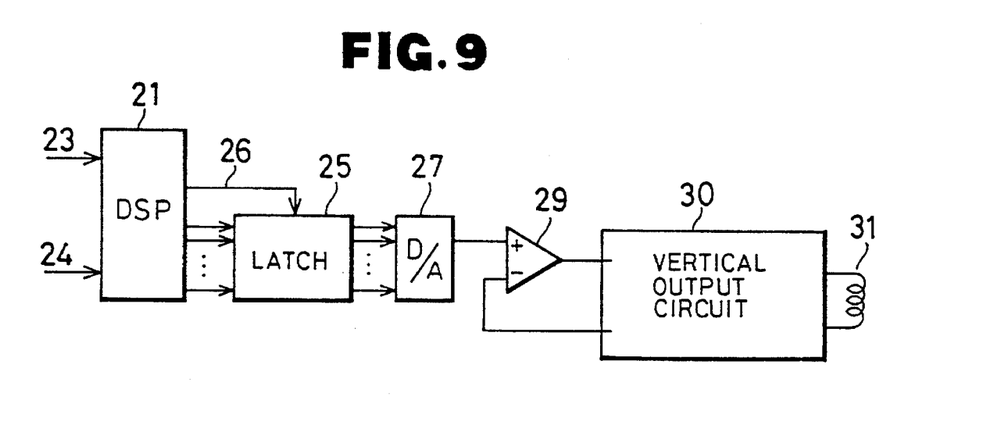
FIG. 9 is a block diagram showing a vertical deflection waveform generating apparatus according to a third embodiment of the present invention.

As shown in FIG. 9, the voltage waveform is fed from the D/A converter 27 to the differential amplifier 29. A configuration of FIG. 9 is identical with that of FIG. 1 except the omitted LPF 28. If the sampling is densely performed at upper and lower portions of vertical deflection, and is roughly performed at a center portion of the vertical deflection, it is possible to realize more accurate vertical deflection.

Embodiment 4

A description will now be given of still another embodiment of the present invention.

Figure 10A:
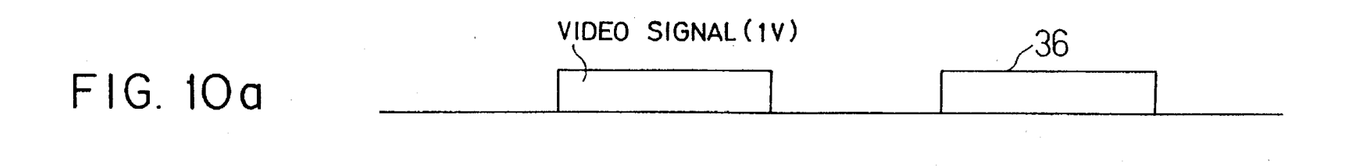
Figures 10B, 10C:
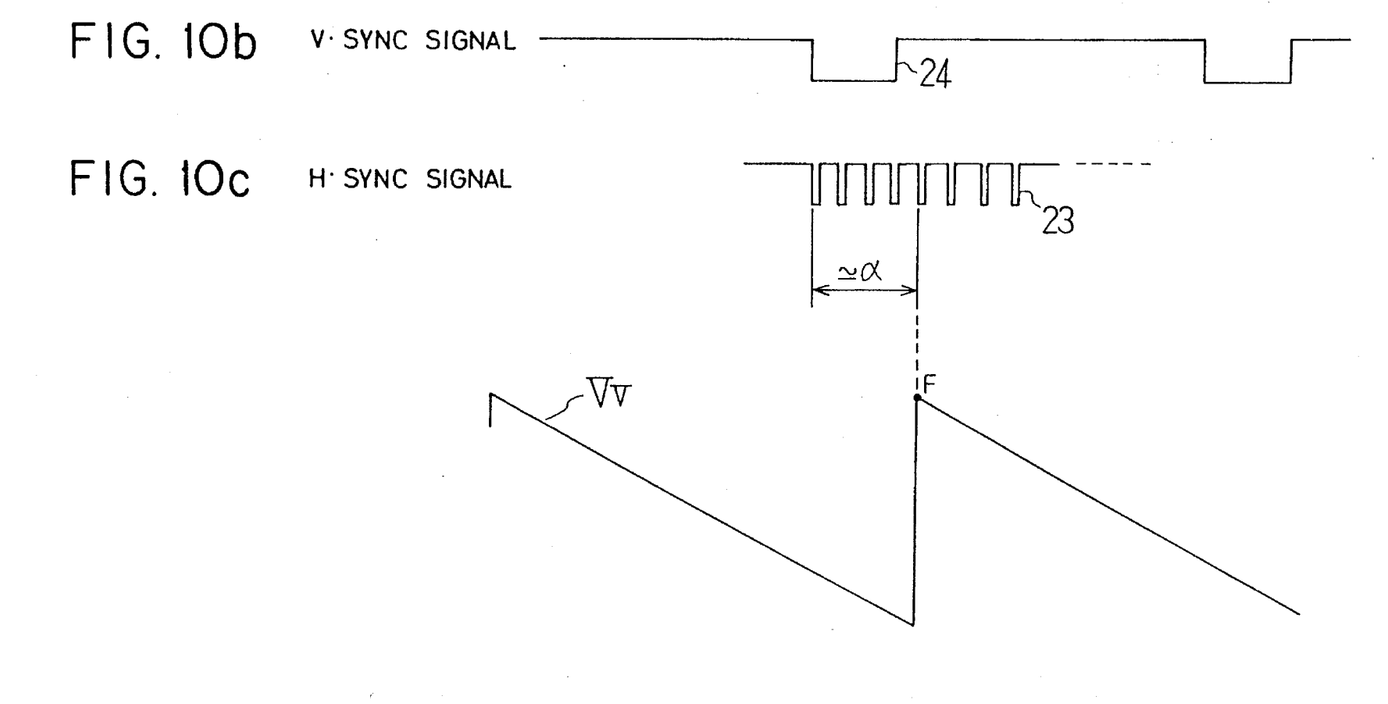

The fourth embodiment relates to adjustment of a vertical raster position. The vertical raster position is adjusted by relatively varying a start time F of vertical deflection voltage $V_v$ with respect to a video signal 36 for a vertical period as shown in FIG. 10. In FIG. 10, α is an adjustment value for the vertical position serving as a parameter to control the start time which is represented by the number of horizontal synchronizing signals 23 in a range of a starting point of a vertical synchronizing signal 24 to the start time F.

In order to find the start time F shown in FIG. 10, it is assumed that no vertical synchronizing signal is detected even after the vertical synchronizing signal is detected in Step ST5. Further, the operation may proceed to Step ST3 such that the vertical deflection voltage $V_v$ can output the start time F at a time of counting the horizontal synchronizing signal by the number represented by the input adjustment value α. Alternatively, instead of counting the horizontal synchronizing signal, a signal from an external counter or a signal from an internal counter of a DSP 21 may be employed.

Embodiment 5

A description will now be given of a still further embodiment of the present invention.

It is an object of the fifth embodiment to remove raster moiré. The raster moiré is generated due to interference between a transmittivity distribution obtained by a luminescent material dot opening line of a CRT and a raster scanning line luminance distribution. The transmittivity distribution obtained by the luminescent material dot opening line is provided by representing a transmission condition of an electronic beam passing through a hole in a shadow mask by using a vertical position of a tube surface as a parameter. The raster scanning line luminance distribution is a luminance distribution of the raster scanning line in a vertical direction of the tube surface, and is shown by reference numeral $G_1$ in FIG. 11.

Figure 11:
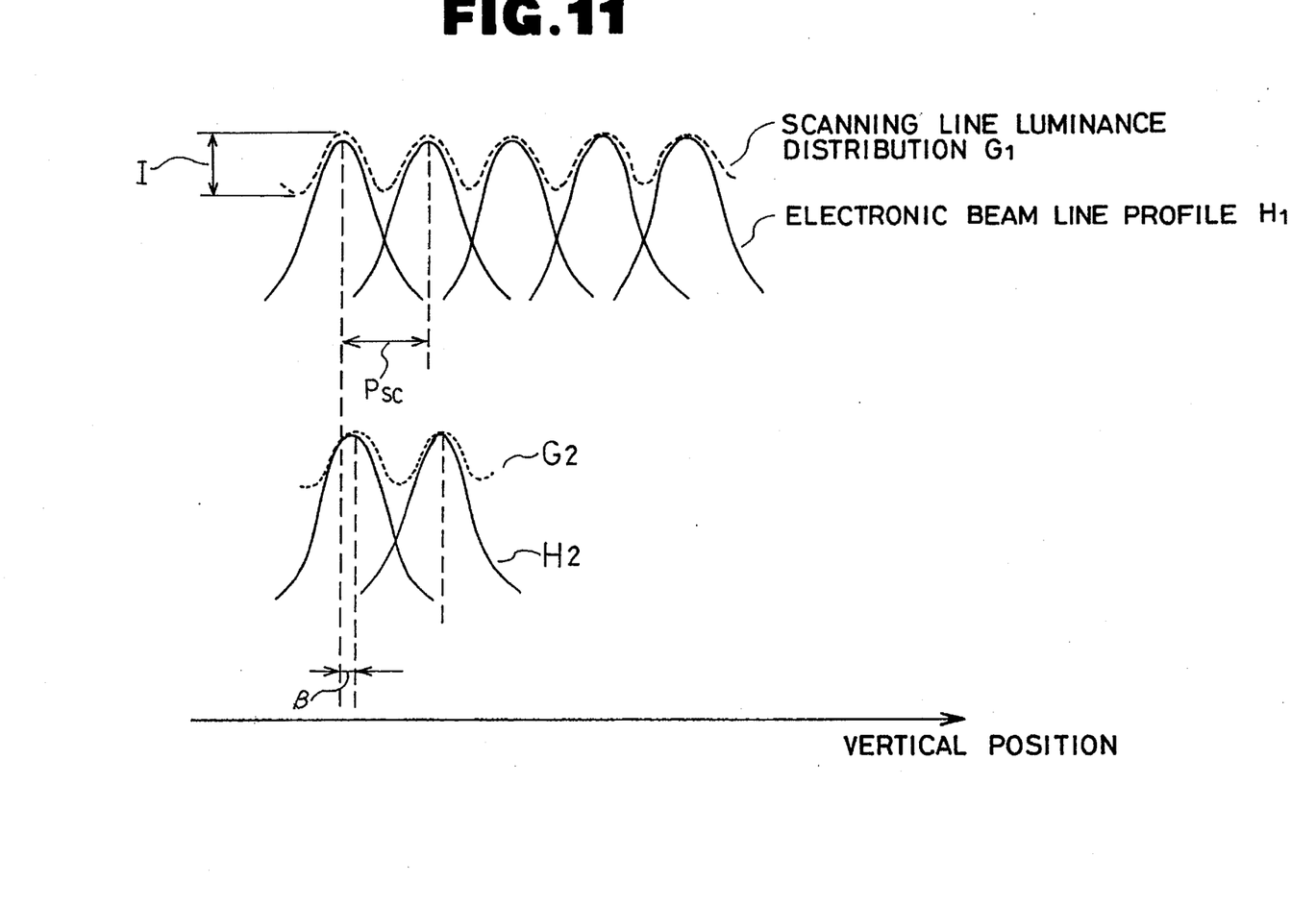
FIG. 11 is a diagram showing scanning line luminance distributions and electronic beam line profiles in a fifth embodiment of the present invention.

In FIG. 11, the scanning line luminance distribution $G_1$ is a luminance distribution of the luminescent material dot by the electronic beam for each line (having a line pitch $P_{sc}$) which is shown by an electronic beam line profile $H_1$. Therefore, it is possible to reduce the moiré by reducing an amplitude I of the scanning line luminance distribution $G_1$.

Figure 12:
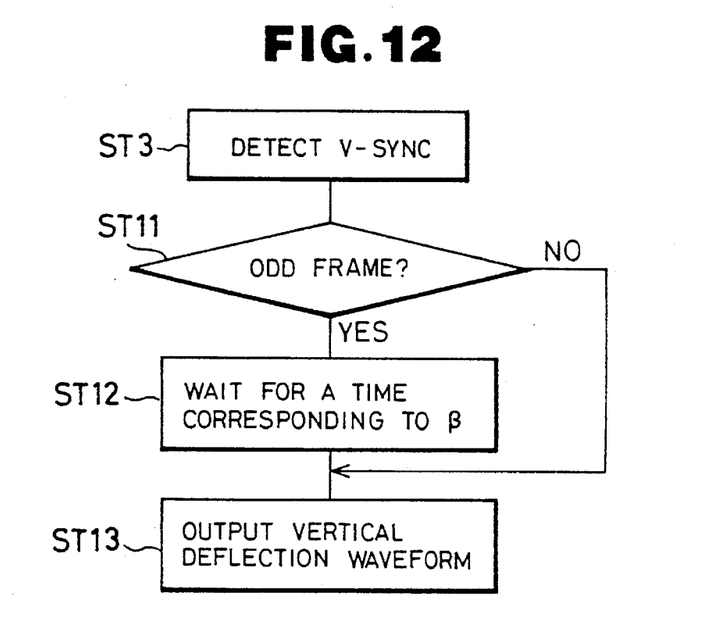
FIG. 12 is a flowchart showing an operation in a fifth embodiment of the present invention.

In order to reduce the amplitude I, the operation proceeds according to a flowchart shown in FIG. 12. In FIG. 12, Steps ST11, ST12, and ST13 are added subsequent to Step ST3 of FIG. 4. An adjustment value β for the vertical position of a raster serving as a parameter to control a start time in FIG. 11 is previously set in the ROM 21a or the E² PROM 22. The value β has a resolution of the clock cycle of DSP 21.

In FIG. 12, when a vertical synchronizing signal is detected in Step ST3, it is decided whether or not a vertical period is in an odd frame in Step ST11. If the vertical period is in the odd field, a vertical deflection voltage waveform is output in Step ST13 after the elapse of a time corresponding to the adjustment value β. When the vertical period is in an even frame in Step ST11, the vertical deflection voltage waveform is immediately output in Step ST13.

That is, as shown by the curves $H_2$ and $G_2$ in FIG. 11, the electronic beam and the scanning line luminance distribution are offset by β so as to offset the vertical position of the raster to positions which cause no visual issue. Further, it is possible to reduce the amplitude I by obtaining a synthetic mean value between the scanning line luminance distributions $G_1$ and $G_2$.

Alternatively, it is possible to appropriately combine the first to fifth embodiments with each other.

While preferred embodiments of the invention have been described using specific terms, such description is for illustrative purposes only, and it is to be understood that changes and variations may be made without departing from the spirit or scope of the following claims.

What is claimed is:

1. A vertical deflection waveform generating apparatus which generates a vertical deflection waveform for performing a raster scan of a cathode-ray tube, said vertical deflection waveform generating apparatus comprising:

storing means in which waveform information of said vertical deflection waveform is represented and stored as a function having a parameter representing a scanning order of each respective horizontal scanning line in said raster scan, said function being a function in which vertical linearity of said raster scan is corrected; and vertical deflection waveform generating means for generating said vertical deflection waveform by substituting each respective scanning order of respective horizontal scanning lines in said parameter of said function, and for calculating vertical deflection waveform voltage, for each horizontal scanning line.

2. A vertical deflection waveform generating apparatus according to claim 1, further comprising horizontal synchronizing signal detecting means for detecting a horizontal synchronizing signal in said raster scan, wherein said vertical deflection waveform generating means generates said vertical deflection waveform by sequentially calculating a vertical deflection voltage corresponding to the next horizontal scanning line at each time when a horizontal synchronizing signal is fed to said vertical deflection waveform generating means.

3. A vertical deflection waveform generating apparatus according to claim 2, wherein said vertical deflection waveform generating means generates a step-wise sawtooth waveform by sequentially subtracting a predetermined value from a vertical deflection voltage corresponding to a horizontal scanning line.

4. A vertical deflection waveform generating apparatus according to claim 3, further comprising a low-pass filter which smooths a step-wise sawtooth waveform output from said vertical deflection waveform generating means.

5. A vertical deflection waveform generating apparatus according to claim 4, wherein said vertical deflection waveform generating means generates a vertical deflection waveform depending upon an input vertical position and an input vertical width of said raster scan.

6. A vertical deflection waveform generating apparatus according to claim 5, wherein said vertical deflection waveform generating means includes a digital signal processor, and wherein said horizontal synchronizing signal detecting means detects a horizontal synchronizing signal by an interrupt handling program of said digital signal processor.

7. A vertical deflection waveform generating apparatus according to claim 1, further comprising vertical synchronizing signal detecting means for detecting a vertical synchronizing signal from said raster scan, wherein said vertical deflection waveform is generated in every other frame of said raster scan by substituting each respective scanning order of said horizontal scanning lines in said parameter, and calculating vertical deflection waveform voltage for each horizontal scanning line when a predetermined period of time elapses after said vertical synchronizing signal is detected by said vertical synchronizing signal detecting means, and wherein said vertical deflection waveform is generated in the other frames by substituting each respective scanning order of said horizontal scanning lines in said parameter, and calculating vertical deflection waveform voltage for each horizontal scanning line immediately after said vertical synchronizing signal is detected by said vertical synchronizing signal detecting means.

8. A vertical deflection waveform generating apparatus according to claim 2, wherein said function is a function which can be expressed as follows:

$$Y = -A \cdot n_i + C \sin\pi \cdot \frac{n_i}{n_T} + B$$

where A is a vertical width of said raster scan, B is a vertical position of said raster scan, C is a parameter for controlling a vertical linearity correction amount of said raster scan, $n_i$ is a scanning order, $n_T$ is a number of all scanning lines, and Y is output voltage.

9. A vertical deflection waveform generating apparatus according to claim 2, wherein said function is a function which can be expressed as follows:

$$Y = -A \cdot n_i^2 + C \sin\pi \cdot \frac{n_i}{n_T} + B$$

where A is a vertical width of said raster scan, B is a vertical position of said raster scan, C is a parameter for controlling a vertical linearity correction amount of said raster scan, $n_i$ is a scanning order, $n_T$ is a number of all scanning lines, and Y is output voltage.

10. A vertical deflection waveform generating apparatus according to claim 2, further comprising vertical synchronizing signal detecting means for detecting a vertical synchronizing signal for said raster scan, wherein said vertical deflection waveform generating means generates said vertical deflection waveform by substituting each respective scanning order of said horizontal scanning lines in said parameter, and calculating vertical deflection waveform voltage for each horizontal scanning line when a predetermined number of horizontal synchronizing signals are detected after said vertical synchronizing signal is detected by said vertical synchronizing signal detecting means.

11. A vertical deflection waveform generating apparatus which generates a vertical deflection waveform raster performing a raster scan of a cathode-ray tube, said vertical deflection waveform generating apparatus comprising:

first storing means in which vertical deflection voltage values corresponding to a subset of scanning lines of a plurality of horizontal scanning lines of said raster scan are stored;

second storing means in which waveform information of a vertical deflection waveform corresponding to scanning lines interposed between said subset of scanning lines is represented and stored as functions having a parameter representing a scanning order of each respective one said plurality of horizontal scanning lines in said raster scan, said functions being functions in which vertical linearity of said raster scan are corrected; and vertical deflection waveform generating means for generating said vertical deflection waveform by substituting each respective scanning order of respective horizontal scanning lines in said parameter, and calculating vertical deflection waveform voltage, for each horizontal scanning line.

12. A vertical deflection waveform generating apparatus according to claim 11, wherein said functions are functions representing straight lines.

13. A vertical deflection waveform generating apparatus according to claim 12, wherein said subset of horizontal scanning lines are sampled relatively infrequently from a raster intermediate portion, and relatively frequently from raster upper and lower portions.

* * * * *